United States Patent [19]

Mullet et al.

[11] Patent Number: 4,916,887
[45] Date of Patent: Apr. 17, 1990

[54] ROTARY MULCHING MOWER

[75] Inventors: Paul W. Mullet, Hesston; Elmer D. Voth, Newton, both of Kans.

[73] Assignee: Excel Industries, Inc., Hesston, Kans.

[21] Appl. No.: 393,274

[22] Filed: Aug. 14, 1989

[51] Int. Cl.[4] .................. A01D 55/00; A01D 35/264
[52] U.S. Cl. .................................. 56/13.8; 56/320.2
[58] Field of Search ........................ 56/13.5–13.8, 56/13.3, 13.4, 320.2, DIG. 17, DIG. 22

[56] References Cited

U.S. PATENT DOCUMENTS

| 3,916,606 | 11/1975 | Brudnak, Jr. et al. | 56/320.2 X |
| 3,974,629 | 8/1976 | Russell et al. | 56/13.7 |
| 4,083,166 | 4/1978 | Haas | 56/13.7 |
| 4,196,568 | 4/1980 | Perry | 56/13.8 |
| 4,263,771 | 4/1981 | Iaboni et al. | 56/13.8 X |
| 4,711,074 | 12/1987 | Jetzinger | 56/13.6 |

FOREIGN PATENT DOCUMENTS 0721026  3/1980  U.S.S.R. ............................ 56/13.8

Primary Examiner—Thuy M. Bui
Attorney, Agent, or Firm—Edward L. Brown, Jr.

[57] ABSTRACT

A rotary type lawn mower and mulcher for mounting a tractor characterized by an open-bottom housing with a discharge opening having two or more cutting blades rotatably journaled in the housing and moving in a common cutting plane, a plurality of high speed mulching blades mounted on a single spindle at various heights positioned in the downstream paths of the cutting blades, the individual cutting blades having a longitudinal cutting edge therealong with lateral corrugations throughout the cutting length thereby increasing the cutting plane depth of each blade whereby the vertical height within the housing above the cutting blades is substantially filled with the cutting planes of the mulching blades whereby the grass clippings from the cutting blades are finely cut and discharged at increased velocities through a discharge opening and a deflection chute positioned downstream thereof with a variable height dam extending into the discharge path of the mulching blades whereby the finely-cut clippings are deflected to achieve an even dispersal pattern of clippings across the angular path of the discharge chute.

14 Claims, 3 Drawing Sheets

ROTARY MULCHING MOWER

FIELD OF THE INVENTION

The invention relates to rotary type grass mowers and more particularly to a mulching type rotary mower having multiple blades and a rear discharge adapted to finely mulch or shred the grass clippings and evenly distribute them through a rear discharge chute.

BACKGROUND OF THE INVENTION

Rotary lawn mowers which have a mulching function have been available in recent decades, but have met with limited commercial success. Mulching devices cut the clippings in sufficiently small size that they will drop down through a stand of grass rather than collect on the top surface of a lawn as do normal grass cuttings. The finely ground cuttings form a valuable mulch which not only diminishes evaporation but also functions as a fertilizer or compost thereby requiring reduced amounts of fertilizer. Dropping the clippings back on the lawn also eliminates the disposal problem as well as the time spent unloading grass catchers and disposing of the clippings.

One of the more common types of mulching systems utilized on a rotary mower comprises a stationary grid having uniform size openings therein positioned directly above the cutting blade which prevents the cuttings from passing therethrough until they are sufficiently recut that the fine cuttings will pass through the openings in the grid. Screens or grid type mulchers are very susceptible to plugging in conditions of high water content which quickly blocks all flow through the mower.

The idea of separate mulcher blades positioned coaxially over the cutting blade is illustrated in the patent to Perry (U.S. Pat. No. 4,196,568); Lalonde (U.S. Pat. No. 4,292,791) and Iaboni (U.S. Pat. No. 4,263,771). In the Perry patent, the mulching blade is located in the same chamber and turns in the opposite direction from the cutting blade like the action of a scissors, while in Lalonde both blades turn in the same direction with the cutting blades pumping the air and clippings upward while the elevated mulching blade and its respective trailing edge tip pumps the air downward back into the cutting blade. In Iabonia, the cutting and mulching blades have separate compartments one on top of the other to perform their functions. The general idea of increasing the speed of the downstream cutting blades in multiple blade mowers is taught in Brudnak (U.S. Pat. No. 3,916,606). In the last mentioned patent, the increased speed of the downstream cutting blade improves the flow of grass cuttings through the mower by increased velocity, however, there is no attempt to shred the clippings. Both patents to Jetzinger (U.S. Pat. No. 4,711,074) and Russell (U.S. Pat. No. 3,974,629) both illustrate different types of hammermill type shredders wherein the mulching blades beat the grass or crop against a stationary cutter which are somewhat similar to the above-mentioned screen type mulchers and have the same inherent disadvantages.

The broad concept of offsetting the mulcher blades axis of rotation from that of the cutting blade and directing the flow of grass clippings from the cutting blade into the mulching blade is generally taught in the patent to Niemann (U.S. Pat. No. 2,956,386). Niemann also teaches utilizing a plurality of mulching blades on a single spindle. Turning through different cutting planes.

SUMMARY OF THE INVENTION

It is therefore the principal object of the present invention to provide an improved rotary type rear discharge mower having multiple cutting blades and mulching blades which distributes the mulch clippings in a broad rear-directed path.

The mulching blades are positioned on a single spindle intersecting the discharge paths of all of the cutting blades while enhancing the airflow through the housing and out the deflector chute. The highly efficient mulching blades pass through multiple cutting planes and due to their corrugated shape, increase their impacting areas with the grass clippings passing therethrough. The mulching blades utilize no stationary elements in conjunction with their cutting action as in the various screen or grid type mulchers mentioned above and therefore have no potential for clogging in wet conditions. The mulching blades not only finely chop the grass clippings which are directed therein along two paths, but also provide an increased air stream out the discharge opening with its higher velocity blade tip rotation for improved distribution of the mulch clippings. The mower of the present invention also includes a deflection chute having a plurality of variable height dams which redirect a portion of the mulch clippings so as to achieve an even density distribution across a wide discharge path.

DETAILED DESCRIPTION OF A PREFERRED EMBODIMENT

Figure 1:
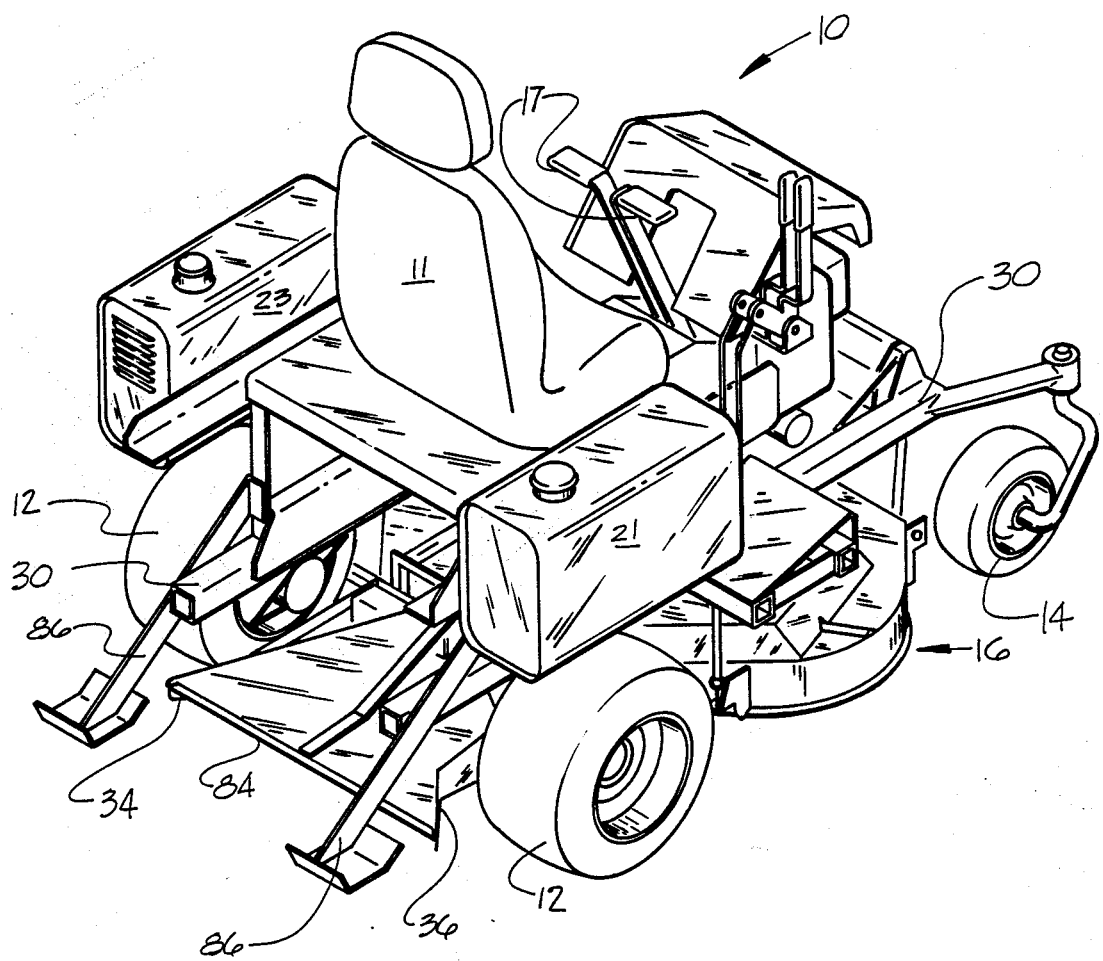
FIG. 1 is perspective view of the multiple blade rear discharge mulching mower according to the present invention.

Referring more specifically to the drawings and more particularly to FIG. 1, a self-propelled mower is generally described by reference numeral 10. The mower includes a pair of differential drive wheels 12 along with a pair of caster front wheels 14 mounted on a frame 30. A pair of operator handles 17 provide variable speed drive to the drive wheels 12 through individual hydrostatic transmissions, all of which is a common drive means for riding grass mowers and well known in the art. Rearwardly extending legs 86 prevents the mower from turning over backward in case excess torque is applied to the drive wheels. The operator's seat 11 is positioned on the mower frame 30 between fuel tank 21 and hydraulic reservoir 23. The drive engine which powers a pump and the various components of the hydraulic system which drives the wheels 12 and blades are not shown or mentioned since they are standard in the art and are not a part of the present invention.

Figure 2:
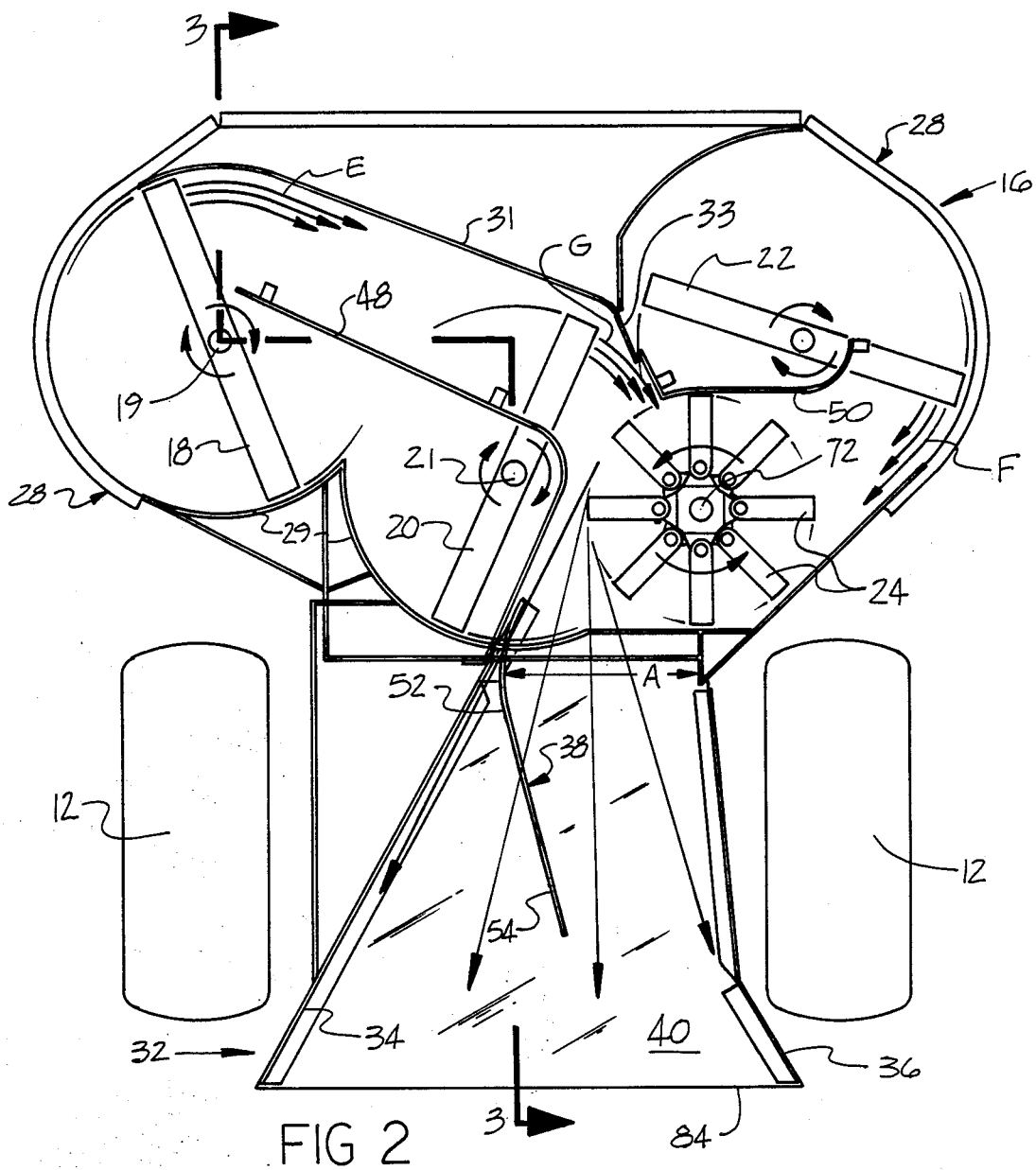
FIG. 2 is a sectional view of the mower taken along lines 2—2 of FIG. 3.

Positioned under the mower frame 30 and suspended therefrom between the front and rear wheels 14 and 12 respectively, is the mower blade housing generally identified by reference numeral 16. Housing 16 incorporates three rotary type cutting blades 18, 20 and 22, as best seen in FIG. 2. The height of housing 16 above the ground is varied by various conventional controls which are not described in detail. Mower 10 is a rear discharge mower whereby the grass clippings are discharged from housing 16 through an opening A, as seen in FIG. 2, positioned between drive wheels 12. Housing 16 comprises a deck 26 through which the drive shafts of each cutting blade extend and are attached thereto with the outer periphery of the housing defined generally by side wall 28. Deck 26 and side wall 28 generally define a blade housing chamber 17. Portions 29 of the side wall closely follow the peripheral path of cutting blades 18 and 20, while other portions 31 extend in a linear direction in adjacent parallel relation with the clipping discharge path E of cutting blade 18. Portion 25 of the side wall surrounding cutting blade 22 essentially follows the peripheral path of blade 22 which is in parallel adjacent relationship with the discharge path F of blade 22. Positioned within housing 16 is a baffle member 48 which attaches to the under surface of deck 26 and extends substantially between cutting blades 18 and 20 and then bends outwardly to the edge of discharge opening A. Baffle 48 extends downwardly just above the cutting plane of blades 18 and 22 and assists in directing the grass clippings from blades 18 and 20 along paths E and G. Baffle 50 positioned just above cutting blade 22 provides a similar function for blade 22 in that it directs the clipings from blade 22 into mulching blades 24 and prevents recirculation. Mounted on a rotating spindle 72 are a plurality of mulching blades 24 which are each swingably mounted on a pair of hubs 58 and 60, as seen in detail in FIGS. 4 and 5, which will be described in detail hereafter.

The eight mulching blades 24 which revolve in a counterclockwise direction as seen in FIG. 2 turn in the opposite direction from the clipping discharge path F of blade 22, and in a normal direction (90° thereto) from the discharge path G of blade 20. The right end of side wall portion 31 has a bent portion 33 which deflects the discharge path G radially inward of the mulching blades 24.

Figure 5:
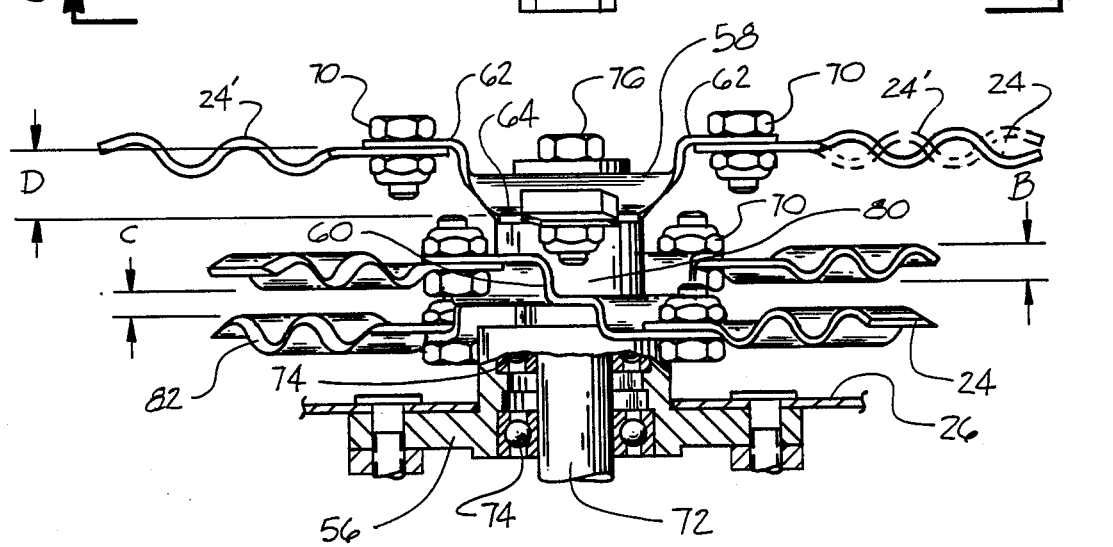
FIG. 5 is a sectional view taken along lines 5—5 of FIG. 4.

Mulching blade spindle 72 is rotatably journaled in head 56 which in turn is bolted to deck 26, as seen in FIG. 5. Attached to spindle 72 are a pair of hubs 58 and 60 which are separated by a spacer sleeve 80. Each hub includes four quadrantally-spaced mounting tabs 62 and 64 which in turn provide pivotal mounting joints for mulching blades 24. Mounting tabs 62, as seen in FIG. 5, are located in a common cutting plane while mounting tabs 64 are offset from tabs 62 in a second cutting plane a distance D. Mulching blades 24 are attached to each of the tabs above-mentioned by bolts 70 whereby when a rigid object is hit, the blade 24 can rotate so as to minimize the damage to the mulching blade assembly.

Figure 4:
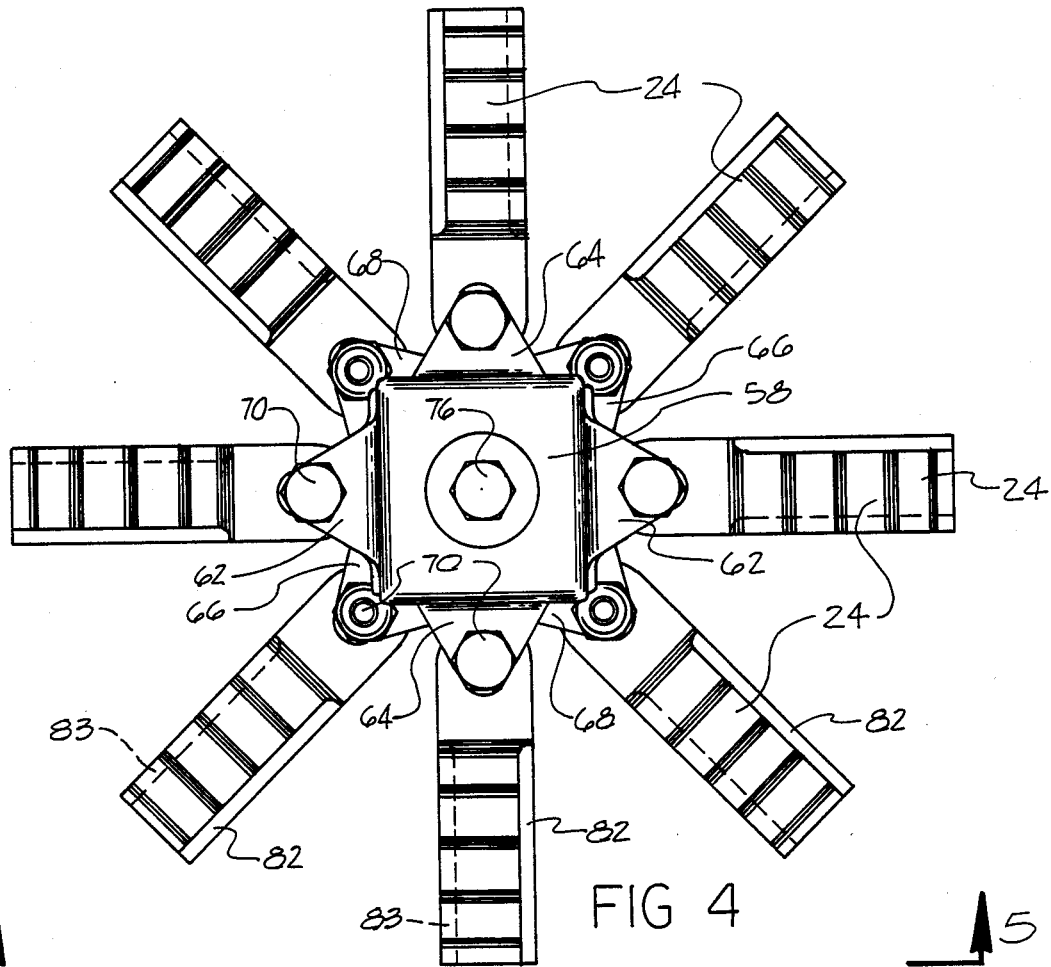
FIG. 4 is a plan view to an enlarged scale of the mulching and shredder blade assembly.

Each mulching blade 24 includes a cutting edge 82 on one side of the blade and a second cutting edge 83 on the opposite thereof, as indicated in FIG. 4. Blade 24 is laterally corrugated along its length so that the blade swings through a cutting plane indicated by distance B, as seen in FIG. 5. An oppositely positioned pair of blades 24 and 24' which rotate through the same plane have their corrugations reversed on opposite sides, as shown in FIG. 5, so that each blade passes through a different path and further increases the grass contacting area of the blades. By reason of the four separate cutting planes through which the blades 24 rotate and their blade depth, the area through which a blade does not rotate is indicated by vertical distance C. When viewing the vertical height within housing 16 above the plane of the cutting blades, it can be seen that the four cutting planes the blades 24 pass through occupy over 50% of that vertical height in the housing. Seated in head 56 are a pair of ball bearings 74 which rotatably support blades 24 on shaft 72. Bolt 76 is threadably received within spindle 72 for attaching hubs 58 and 60 along with their respective blades.

Figure 3:
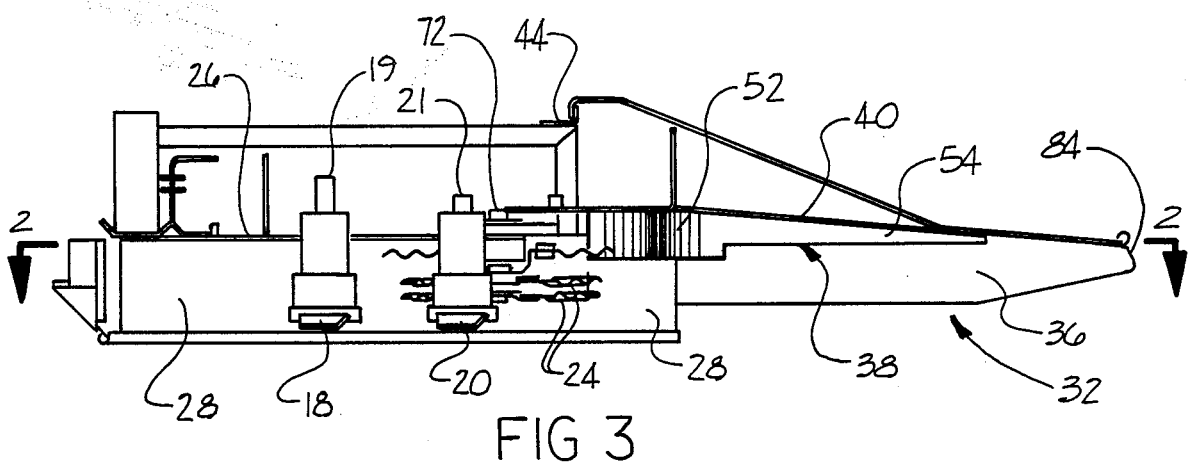
FIG. 3 is a sectional view taken along lines 3—3 of FIG. 2 of the mower housing and deflection chute.

Removably attached to the housing 16 of the mower is a deflector chute 32 which comprises a planar top 40, vertical side walls 34 and 36, and a hanger arm 42, as seen in FIG. 3. The deflector 32 removably hangs on a vertical flange 44 of the mower frame and has an entry opening of similar width to discharge opening A of the housing and a widely spaced discharge end 84. Extending downwardly from the under side of deflector 32 at the left edge of discharge opening A, as seen in FIG. 2, is a variable height dam 38. Initially dam 38 is flush and parallel with side wall 34 at its maximum height portion 52, however, as dam 38 extends, it bends inwardly across the flow path and extends to the approximate center of the deflector 32. As the dam 38 extends, it decreases in height in its minimum height portion 54, as seen in FIG. 3. Since variable height dam 38 extends only partially into the discharge stream, only a portion of the discharge stream is deflected whereby a more even distribution of mulched clippings is provided across the full discharge end 84 of deflector 32.

The cutting blades 18, 20 and 22, as well as the mulching blades 24, are all driven by pulleys and V-belts, the details of which are not shown since they are conventional drive means and not considered a part of the present invention. In the alternative, each cutting blade drive shaft could be driven by a conventional hydraulic motor from a second hydraulic engine-driven pump.

OPERATION

With the mower 10 in operation, the cutting blade shaft speed would be approximately 3520 RPM while the mulching blade shaft speed would be approximately 5860 RPM. The grass clippings discharged from cutting blades 18 and 20 will combine flowing along paths E and G as indicated in FIG. 2. Side wall portion 33 will turn the clippings in path G to normally intersect the mulching blades 24 which are turning in a counterclockwise direction. Baffle 48 helps to channel the air flow and clippings in paths E and G. Cutting blade 22 directs its grass clippings along path F which flows into the mulching blades 24 tangentially which are turning in the opposite direction. Baffle 50 extending outwardly from the axis of cutting blade 22 not only channels the discharge clippings from blade 22 but also limits the path the mulch clippings are discharged from blades 24. While the mulching blades have a tendency to discharge more of the mulch clippings out of the left side of the deflector chute 32, as seen in FIG. 2, the vertical dam 38 deflects a portion of that left side flow towards the right side of the deflector chute thereby discharging a more even amount of mulch clippings across the complete discharge edge 84 of the deflector 32.

As a result of the high velocity discharge of air from mulching blades 24 and its relatively wide annular dispersal flow, the mulch clippings are widely spread approximately the width of the cutting swath of the mower in a relatively even dispersal rate thereacross.

The mower 10 can also utilize a grass catcher, not shown, in place of deflector chute 32. The finely cut mulched clippings occupy one-third less volume than regular grass clippings.

While the invention has been described with a certain degree of particularity, as to cutting blade geometry, it is manifest that many changes may be made in the details of the construction and the arrangement of the various components without departing from the spirit and scope of this disclosure. It is understood that the invention is not limited to the embodiments set forth herein for purposes of exemplification, but it is only by the scope of the attached claims, including a full range of equivalency to which each element is entitled.

What is claimed is:

1. A rotary type rear discharge mower and mulcher for mounting on a tractor having a pair of drive wheels comprising:

an open bottom housing having a rear discharge opening;

at least two cutting blades rotatably journaled in the housing moving in a common cutting plane in non-overlapping side-by-side relation, the housing having side walls substantially surrounding the circumferential path of the cutting blades;

a plurality of high speed mulching blade means mounted on a vertical spindle journaled within the housing, and positioned in the downstream paths of the cutting blades in partially overlapping relation, with the mulching blades in planes of rotation above the cutting blades and positioned approximate said discharge opening whereby the grass clippings from the cutting blades are finely cut and discharged at increased velocities through said discharge opening; and a deflection chute positioned between the pair of drive wheels at said discharge opening including a planar top surface.

2. A rotary type rear discharge mower as set forth in claim 1, wherein the deflection chute has side walls at its outer edges, and a variable height dam means extending downwardly from the top surface into the discharge path of the mulching blade means whereby portions of the finely cut clippings are deflected to achieve an even dispersal pattern of clippings throughout a radiating angular path.

3. A rotary type rear discharge mower as set forth in claim 1, wherein the mulching blade means includes a plurality of hubs in stacked relation with mounting tabs in different planes of rotation and a plurality of blades rotatably attached to said tabs which rotate in different planes of rotation within said housing.

4. A rotary type rear discharge mower as set forth in claim 1, wherein the mulching blade means includes a plurality of hubs in stacked relation with mounting tabs in different planes of rotation and a plurality of blades rotatably attached to said tabs which rotate in different planes of rotation within said housing, and each blade includes a longitudinal cutting edge and lateral corrugations throughout its cutting length to provide a cutting plane of increased depth.

5. A rotary type rear discharge mower as set forth in claim 1, wherein the mulching blade means includes a plurality of hubs in stacked relation with mounting tabs in different planes of rotation and a plurality of blades rotatably attached to said tabs which rotate in different planes of rotation within said housing and each blade includes a longitudinal cutting edge and blade having lateral corrugations throughout its cutting length to provide a cutting plane of increased depth wherein the combined depths of cutting planes of the blades are at least ⅓ (one-third) the vertical spacing in the housing above the cutting blades.

6. A rotary type rear discharge mower as set forth in claim 1, wherein the mulching blade means includes a plurality of hubs in stacked relation with mounting tabs in different planes of rotation and a plurality of blades rotatably attached to said tabs which rotate in different planes of rotation within said housing and each mulching blade includes a longitudinal cutting edge on opposite sides whereby the blades may be turned over to provide a second edge.

7. A rotary type rear discharge mower as set forth in claim 1, wherein the deflection chute is angular in shape with an increased width discharge and the chute includes a top surface which is substantially horizontal, an entry opening, a dam means extending downwardly from said top surface including a maximum height portion beginning at one side of said entry opening and curving partially thereacross, a minimum height portion extending further across the chute whereby the shredded clippings are partially deflected across the angular width of the chute to achieve an even distribution of clippings throughout its angular width.

8. A rotary type rear discharge mower as set forth in claim 1, wherein the tip velocity of the shredder blades exceeds that of the cutting blades.

9. A rotary type mower and mulcher for mounting on a tractor having a pair of drive wheels comprising:

an open bottom housing having a discharge opening;

at least three cutting blades rotatably journaled in the housing moving in a common cutting plane in non-overlapping side-by-side relation with multiple discharge paths, the housing having side walls substantially surrounding the circumferential path of the cutting blades except for the discharge opening;

a plurality of high speed mulching blade means mounted on a vertical shaft journaled within the housing, and positioned in the multiple downstream discharge paths of the cutting blades in partially overlapping relation therewith in planes of rotation above the cutting blades and positioned approximate said discharge opening whereby the grass clippings from the three cutting blades are finely cut and discharged at increased velocities through said discharge opening; and a deflection chute positioned between the pair of drive wheels at said discharge opening including a planar top surface.

10. A rotary type rear discharge mower as set forth in claim 9, including a first baffle means attached to the underside housing extending substantially radially from a first cutting blade to the adjacent second cutting blade defining a first discharge path whereby the clippings from said first and second blades are directed toward the shredder blade means.

11. A rotary type rear discharge mower as set forth in claim 9, including a first baffle means positioned in the housing above the cutting blades extending substantially radially from a first cutting blade axis to the adjacent second cutting blade axis defining a first discharge path whereby the clippings from the first and second cutting blades are directed radially toward the mulching blade means and a second baffle means positioned in the housing above the cutting blade extending radially from the axis of the third cutting blade substantially to a circumferential edge of the mulching blade means defining a second discharge path whereby the clippings of the third cutting blade are directed tangentially toward the mulching blade means in reverse directions.

12. A rotary type rear discharge mower as set forth in claim 9, wherein the first and second cutting blades have a common first discharge path and the third cutting blade has a separate second discharge path.

13. A rotary type rear discharge mower as set forth in claim 9, wherein the first and second cutting blades have a common first discharge path which radially intercepts said mulching blade means, and the third cutting blade has a separate second discharge path which tangentially intercepts said mulching blade means.

14. A rotary type mower and mulcher for mounting on a tractor having drive wheels comprising:
an open bottom housing having a discharge opening;
at least one cutting blade rotatably journaled in the housing moving in a common cutting plane, the housing having side walls substantially surrounding the circumferential path of the cutting blade;
a plurality of mulching blade means turning at higher speeds than the cutting blade mounted on a vertical spindle journaled within the housing, and positioned in the downstream path of the cutting blade, each blade means including a longitudinal cutting edge and lateral corrugations throughout its cutting length to increase its cutting plane depth, each means is positioned in a closely spaced plane of rotation above the other whereby the grass clippings from the cutting blade are finely cut and discharged at increased velocities through said discharge opening.

* * * * *